United States Patent [19]
Yoshinaga et al.

[11] 3,819,483
[45] June 25, 1974

[54] METHOD OF PRODUCING L-PROLINE BY FERMENTATION

[75] Inventors: Fumihiro Yoshinaga; Takayasu Tsuchida, both of Kawasaki; Shinji Okumura, Tokyo, all of Japan

[73] Assignee: Ajinomoto Co., Inc., Tokyo, Japan

[22] Filed: Jan. 26, 1973

[21] Appl. No.: 326,661

[52] U.S. Cl.................... 195/29, 195/28 R, 195/30
[51] Int. Cl............................................. C12d 1/00
[58] Field of Search................. 195/28 R, 29, 30, 47

[56] References Cited
UNITED STATES PATENTS
3,329,577    7/1967    Okumura et al...................... 195/29

OTHER PUBLICATIONS

Chemical Abstracts, Vol. 75; 47457t; 1971.

*Primary Examiner*—A. Louis Monacell
*Assistant Examiner*—Robert J. Warden
*Attorney, Agent, or Firm*—Hans Berman; Kurt Kelman

[57] ABSTRACT

Proline-producing, artificially induced mutants of Brevibacterium and Corynebacterium produce more proline than the respective parent strains if the growth of the mutants is less inhibited by sulfa drugs than that of the parent strains.

5 Claims, No Drawings

METHOD OF PRODUCING L-PROLINE BY FERMENTATION

This invention relates to the production of L-proline, and particularly to a method of producing L-proline by fermentation.

L-Proline, hereinafter referred to as proline, has been used as a food supplement, medicine, and in medical research.

It was known heretofore that certain auxotrophs belonging to genus Brevibacterium produce proline in a medium (U.S. Pat. No. 3,329,577). The concentration of proline accumulated by this method is, however, at most 1.5 grams per deciliter under favorable conditions.

We have now found that remarkably improved amounts of proline are accumulated in an aqueous culture medium by mutant strains resistant to sulfa drugs, of Brevibacterium, or Corynebacterium. When the mutants are derived from proline producing auxotroph, parent strains, the production of proline is extremely improved. Moreover, mutant strains derived from parent strains incapable of producing proline can produce significant amounts of proline.

The method of mutation is conventional such as exposure of cells of the parent strains to ultra-violet light, X-rays, or gamma rays in mutagenic doses, or to sodium nitrite, nitrosoguanidine, or diethyl sulfate solution in a manner conventional in itself. For example, the cells of a parent strain on an agar nutrient medium are exposed to ultra-violet light (2,375A) from a source which is placed 30 cm away, for 3 minutes.

The mutants resistant to sulfa drugs are selected from the exposed parent strain by conventional methods. The exposed parent strain is cultured on an agar medium or in an aqueous nutrient medium containing an amount of sulfa drugs which inhibits growth of the parent strain. Then, the mutants resistant to the sulfa drugs are screened. Resistance of a mutant to sulfa drugs is determined by comparing the relative growth of the mutant strain on a sulfa drugs-containing medium with that of the parent strain. The relative growth is the ratio of growth on a medium containing sulfa drugs to growth on a medium free from sulfa drugs.

The sulfa drugs used in this invention contain the group

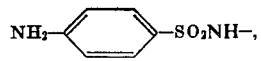

and have anti-microbial action which is suppressed by p-aminobenzoic acid.

Presently known sulfa drugs having the features mentioned above are sulfapyridine, sulfathiazole, sulfadiazine, sulfaguanidine, sulfamethazine, sulfamerazine, sulfadimethoxine, sulfamethomidine, sulfamethoxypyridazine, sulfisomidine, sulfisoxazole, acetosulfamine, sulfanylamide, sulfisomezole, sulfaphenazole, sulfamethizole, sulfacthidole, sulfapyrazine, irgafen and irgamide.

The most effective proline-producing mutants found so far (and the sulfa drugs employed in screening them) are *Brevibacterium flavum* FERM-P 1681 (sulfaguanidine), *Brevibacterium flavum* FERM-P 1682 (sulfaguanidine), *Corynebacterium acetoacidophilum* FERM-P 1683 (sulfamerazine) and *Corynebacterium glutamicum* FERM-P 1781 (sulfaguanidine).

Specimen cultures of microorganism identified by FERM-P number are freely available to qualified persons without our permission from the Fermentation Research Institute, Agency of Industrial Science and Technology at 1-8-5, Inage Higashi, Chiba-shi, Chiba, Japan.

The nutrient media fermented by means of the microorganisms of this invention are conventional in themselves and contain assimilable sources of carbon and nitrogen, and inorganic salts. Minor amounts of organic nutrient such as vitamines and amino acids may be added. Assimilable carbon sources include carbohydrates such as glucose, starch hydrolyzates or molasses, alcohols such as ethanol, organic acids such as acetic acid and other conventional carbon sources. Assimilable nitroben sources include organic or inorganic nitrogen-containing compounds such as nitrates, ammonium salts, gaseous ammonia, ammonium hydroxide solution and urea.

For a good yield of proline, the fermentation is carried out aerobically with aeration and/or agitation. Best yield requires pH control within the range of 5 to 9. The desired pH may be maintained by adding gaseous or aqueous ammonia, calcium carbonate, alkali metal hydroxide, urea, organic or inorganic acids to the medium from time to time, some of which may also supply assimilable nitrogen. When the fermentation is carried out at 24°C to 37°C, the concentration of proline in the broth reaches its maximum within 2 to 7 days.

The proline accumulated in the fermentation broth can be recovered by conventional methods, such as removing cells by filtration or centrifugation, passing the broth over an ion exchange resin and precipitation at the isoelectric point of proline.

The following examples further illustrate the invention.

Example 1

Relative growth in sulfaguanidine containing medium of sulfa drug resistant mutant Brevibacterium flavum FERM-P 1681 which was screened on an agar medium containing 500 γ/ml sulfaguanidine, and that of its parent strain Brevibacterium flavum ATCC 15940 (isoleucine requiring and proline producing mutant) are shown in Table 1.

Table 1

| Sulfaguanidine added (γ/ml) | Relative Growth of | |
|---|---|---|
| | Brev. flavum FERM-P 1681 | Brev. flavum ATCC 15940 |
| 0 | 100 | 100 |
| 100 | 98 | 95 |
| 200 | 95 | 88 |
| 300 | 90 | 42 |
| 400 | 68 | 0 |
| 500 | 40 | 0 |
| 600 | 11 | 0 | medium: 2 g/dl glucose, 1 g/dl $(NH_4)_2SO_4$, 0.1 g/dl urea, 50 γ/l biotin, 100 γ/l thiamine·HCl, 20 mg/dl L-isoleucine, 0.1 g/dl $KH_2PO_4$, 0.3 g/dl $K_2HPO_4$, 0.1 g/dl $MgSO_4·7H_2O$, 2 ppm $Fe^{++}$, 2 ppm $Mn^{++}$ and sulfaguanidine in Table.

cultivation: 3 ml of the medium are placed in 10 ml test tube, inoculated with $2 \times 10^7$ cells, and cultured at 31.5°C for 48 hours.

An aqueous medium was prepared to contain 10 g/dl glucose, 4 g/dl $(NH_4)_2SO_4$, 0.1 g/dl $KH_2PO_4$, 0.04 g/dl $MgSO_4·7H_2O$, 0.1 g/dl tartaric acid, 0.2 mg/dl ferric ion, 0.2 mg/dl manganese ion, 450 γ/l biotin, 1000 γ/l thiamine·HCl, 10 mg/dl L-isoleucine, 0.1 ml/dl soybean protein hydrolyzate and 5 g/dl $CaCO_3$, and adjusted to pH 7.0. 300 ml batches of the medium were placed in 1000 ml fermentation vessels, sterilized by steam, and inoculated with *Brevibacterium flavum* FERM-P 1681. Fermentation was carried out at 31°C for 72 hours. The pH of the medium was adjusted during the fermentation by introducing gaseous ammonia.

After the cultivation, 2.89 g/dl proline was found in the fermentation broth. One liter of the combined broth was filtered to remove cells, and passed over an ion-exchange resin. The resin was eluted with ammonium hydroxide solution, and the eluate was partly evaporated in a vacuum. Thereafter, 14.5 grams of proline crystals were obtained by pouring ethylalcohol into the eluate.

When Brevibacterium flavum ATCC 15940 was cultured by the same method as above, 1.50 g/dl proline was found in the fermentation broth.

Example 2

Relative growth in sulfaguanidine containing medium of sulfa drug resistant mutant, Brevibacterium flavum FERM-P 1682 which was screened on an agar medium containing 500 γ/ml sulfaguanidine, and that of its parent strain *Brevibacterium flavum* ATCC 15942 (histidine requiring and proline producing mutant) are shown in Table 2.

Table 2

| Sulfaguanidine added (γ/ml) | Relative Growth of | |
|---|---|---|
| | Brev.flavum FERM-P 1682 | Brev.flavum ATCC 15942 |
| 0 | 100 | 100 |
| 100 | 100 | 100 |
| 200 | 100 | 100 |
| 300 | 97 | 75 |
| 400 | 78 | 13 |
| 500 | 47 | 0 |
| 600 | 30 | 0 |

The cultivation condition was the same as in Example 1, except that 20 mg/dl L-histidine was employed in place of 20 mg/dl L-isoleucine.

*Brevibacterium flavum* FERM-P 1682 was cultured in the same medium as described in Example 1 except that 10 mg/dl L-histidine was used in place of 10 mg/dl L-isoleucine, under the same cultivation condition as in Example 1. After cultivation, 2.66 g/dl proline was found in the fermentation broth.

When *Brevibacterium flavum* ATCC 15942 was cultured by the same method as above, 0.76 g/dl proline was found in the fermentation broth.

Example 3

Relative growth in sulfamerazine containing medium of sulfa drug resistant mutant Corynebacterium acetoacidophilum FERM-P 1683 which was screened on an agar medium containing 500 γ/ml sulfamerazine, and that of its parent strain *Corynebacterium acetoacidophilum* FERM-P 1780 (isoleucine requiring and proline producing mutant) are shown in Table 3.

Table 3

| Sulfamerazine added (γ/ml) | Relative Growth of | |
|---|---|---|
| | Coryn. acetoacidophilum FERM-P 1683 | Coryn. acetoacidophilum FERM-P 1780 |
| 0 | 100 | 100 |
| 100 | 100 | 100 |
| 200 | 100 | 100 |
| 300 | 96 | 75 |
| 400 | 78 | 13 |
| 500 | 50 | 0 |
| 600 | 31 | 0 |

The cultivation condition was the same as in Example 1.

Corynebacterium acetoacidophilum FERM-P 1683 was cultured in the same manner as described in Example 1. After cultivation, 2.10 g/dl proline was found in the fermentation broth; while when Corynebacterium acetoacidophilum was cultured by the same method as above, 1.08 g/dl proline was found in the fermentation broth.

Example 4

An aqueous culture medium was prepared to contain 0.8 g/dl ammonium acetate, 0.41 g/dl sodium acetate, 0.3 g/dl $(NH_4)_2SO_4$, 0.2 g/dl $KH_2PO_4$, 0.04 g/dl $MgSO_4·7H_2O$, 0.2 mg/dl ferric ion, 0.2 mg/dl manganese ion, 1 ml/dl soy protein hydrolyzate, 15 mg/dl L-isoleucine, 450 γ/l biotin, 1000 γ/l thiamine·HCl, 0.2 g/dl urea. Three hundreds mililiter of the medium was placed in a 1000 ml jar-fermenter and sterilized at 110°C for 10 min.

*Brevibacterium flavum* FERM-P 1681 was cultured in an aqueous medium containing 1.5 g/dl starch acid-hydrolyzate, 0.3 g/dl ammonium acetate, 0.3 g/dl $(NH_4)_2SO_4$, 0.15 g/dl $KH_2PO_4$, 0.04 g/dl $MgSO_4·7H_2O$, 0.2 g/dl ferric ion, 0.2 g/dl manganese ion, 1 ml/dl soy protein acid-hydrolyzate, 15 mg/dl L-isoleucine, 450 γ/l biotin, 1000 γ/l thiamine·HCl and 0.2 g/dl urea, at 31.5°C for 12 hours. Fifteen mililiter of this cultured broth was transferred to the 1000 ml jar-fermenter.

Fermentation was carried out aerobically at 31.5°C. During the fermentation, the pH of the medium was maintained at 7.5 to 8.0 by introducing gaseous ammonia and aqueous 50 g/dl acetic acid solution into the fermenter. After 48 hours' cultivation, 20 g of acetic acid per 100 ml of medium was consumed and 4.70 g/dl proline was accumulated in the fermentation broth.

9.1 G of crude crystals of proline was recovered by the same recovery method as in Example 1 from 200 ml of the broth.

Example 5

Corynebacterium acetoacidophilum FERM-P 1683 was cultured in a manner analogous to that described in Example 4. After 48 hours' cultivation, 16.9 g of acetic acid for 100 ml of medium was consumed and 4.23 g/dl proline was accumulated in the fermentation broth.

Example 6

An aqueous culture medium was prepared to contain 1.5 g/dl ethanol, 0.5 g/dl ammonium sulfate, 0.1 g/dl KH$_2$PO$_4$, 0.04 g/dl MgSO$_4$·7H$_2$O, 0.2 g/dl ferric ion, 0.2 g/dl manganese ion, 2 ml/dl soy protein acid-hydrolyzate, 15 mg/dl L-isoleucine, 450 γ/l biotin, 1000 γ/l thiamine·HCl, 0.5 ml/dl corn steep liquor and 0.1 g/dl urea, and adjusted to pH 7.2. 300 ml of the medium was placed into a 1000 ml jar fermenter and sterilized by steam.

Brevibacterium flavum FERM-P 1681 which was previously cultured on a bouillon agar slant was inoculated into the medium, and cultured aerobically at 31.5°C. During fermentation, the pH of the medium was maintained at 7.5 to 8.0 by introducing gaseous ammonia, and the concentration of ethanol in the medium was maintained at about 0.1 g/dl by feeding 90 percent ethanol solution. After 48 hours' cultivation, 10 g of ethanol per 100 ml of medium was consumed and 1.00 g proline was accumulated in the fermentation broth.

Example 7

Corynebacterium acetoacidophilum FERM-P 1683 was cultured in a manner analogous to that described in Example 6. After 48 hours' cultivation, 11.2 g of ethanol per 100 ml of medium was consumed and 0.8 g/dl proline was accumulated in the fermentation broth.

Example 8

The relative growth in a sulfaguanidine containing medium, of the sulfa drug resistant mutant Corynebacterium glutamicum FERM-P 1781 which was screened on an agar medium containing 500 γ/ml sulfaguanidine, and that of its parent strain Corynebacterium glutamicum (Micrococcus glutamicus) ATCC 13032 (wild strain incapable of producing proline) are shown in Table 4.

Table 4

| Sulfaguanidine added (γ/ml) | Relative Growth of Coryn.glutamicum FERM-P 1781 | Relative Growth of Coryn.glutamicum ATCC 13032 |
|---|---|---|
| 0 | 100 | 100 |
| 100 | 100 | 100 |
| 200 | 100 | 95 |
| 300 | 100 | 84 |
| 400 | 81 | 50 |
| 500 | 32 | 0 |
| 600 | 0 | 0 |

Corynebacterium glutamicum FERM-P 1781 was cultured by the same method as described in Example 1. After cultivation, 1.50 g/dl proline was found in the fermentation broth. W When, Corynebacterium glutamicum ATCC 13032 was cultured as above, proline was not detected in the fermentation broth.

What is claimed is:

1. A method of producing L-proline which comprises:
   a. culturing an artificially induced L-proline producing mutant of a parent strain of Brevibacterium or Corynebacterium under aerobic condition in an aqueous culture medium containing assimilable sources of carbon and nitrogen and inorganic salts until L-proline accumulates in the medium,
      1. said mutant having greater relative growth in a medium containing at least one sulfa drug than said parent strain, and
      2. said sulfa drug being sulfapyridine, sulfathiazole, sulfadiazine, sulfaguanidine, sulfamethazine, sulfamerazine, sulfadimethoxine, sulfamethomidine, sulfamethoxypyridazine, sulfaisomedine, sulfisoxazole, acetosulfamine, sulfanylamide, sulfisomezole, sulfaphenazole, sulfamethizole, sulfaethidole, sulfapyrazine, irgafen or irgamide; and
   b. recovering accumulated L-proline from said culture medium.

2. A method as set forth in claim 1, wherein said mutant is Brevibacterium flavum FERM-P 1681.

3. A method as set forth in claim 1, wherein said mutant is Brevibacterium flavum FERM-P 1682.

4. A method as set forth in claim 1, wherein said mutant is Corynebacterium acetoacidophilum FERM-P 1683.

5. A method as set forth in claim 1, wherein said mutant is Corynebacterium glutamicum FERM-P 1781.

* * * * *